US006470115B1

(12) United States Patent
Yonekubo

(10) Patent No.: US 6,470,115 B1
(45) Date of Patent: Oct. 22, 2002

(54) OPTICAL SWITCHING ELEMENT AND IMAGE DISPLAY DEVICE

(75) Inventor: Masatoshi Yonekubo, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/089,221

(22) Filed: Jun. 3, 1998

(30) Foreign Application Priority Data

Jun. 18, 1997 (JP) ............................................. 9-161695
Sep. 26, 1997 (JP) ............................................. 9-262271

(51) Int. Cl.[7] ................................................. G02B 6/26
(52) U.S. Cl. .............................. 385/32; 385/15; 385/16; 385/18; 385/19; 385/25; 385/30; 385/31; 385/36; 385/47; 385/48
(58) Field of Search .............................. 385/15, 16, 18, 385/19, 25, 27, 30, 31, 36, 37, 47, 48

(56) References Cited

U.S. PATENT DOCUMENTS 5,031,987 A  7/1991  Norling
5,771,321 A  * 6/1998  Stern ........................... 385/31

FOREIGN PATENT DOCUMENTS

JP    A-7-287176    10/1995
JP    A-10-78549    3/1998

OTHER PUBLICATIONS

SID 98 Digest, "Waveguide Panel Display Using Electrochemical Spatial Modulators", X. Zhou et al., pp. 1022–1025.

* cited by examiner

*Primary Examiner*—Audrey Chang
*Assistant Examiner*—Craig Curtis
(74) *Attorney, Agent, or Firm*—Oliff & Berridge, PLC.

(57) ABSTRACT

The present invention provides an optical switching element causing less loss of light and permitting high response, thinning of an optical system for illumination, and the realization of an image display device exhibiting precise grayscale properties. In the optical switching element, an extraction surface of a light extraction unit mounted to a thin film is brought into contact with the total reflection surface of a light guide serving as a light guide unit comprising a glass plate or the like for transmitting light by total reflection, or near at a distance from the total reflection, surface for allowing extraction of evanescent waves, to extract the incident light transmitted through the light guide and emit the extracted light to the outside through an emission member. Such optical switching permits the light extract unit to be operated in a range of approximately a wavelength or half a wavelength, thereby providing an optical switching element capable of high-speed operation and having high contrast because the incident light does not leak due to total reflection during an off time.

54 Claims, 16 Drawing Sheets

OPTICAL SWITCHING ELEMENT AND IMAGE DISPLAY DEVICE

BACKGROUND OF THE INVENTION

1. Field of Invention

The present invention relates to an optical switching element (light valve) used for optical communication and optical computation. The invention also relates to an optical switching element used in an optical storage device, an optical printer, an image display device, etc., and particularly in an image display device.

2. Description of Related Art

A conventional optical switching element comprises a liquid crystal. As shown in a schematic configuration of FIG. 16, a conventional optical switching element 900 comprises polarizers 901 and 908, glass plates 902 and 903, transparent electrodes 904 and 905, and a liquid crystal 906 or 907, so that when a voltage is applied between the transparent electrodes, the direction of liquid crystal molecules is changed to rotate the surface of polarization, resulting in optical switching. A conventional image display device comprises a liquid crystal panel having such optical switching elements (liquid crystal cells) arranged in a two-dimensional form, in which the direction of liquid crystal molecules is controlled by adjusting the applied voltage to achieve grayscale.

However, a liquid crystal has low responsiveness, and is operated at a response speed of only several milliseconds. Therefore, it is difficult to apply an optical switching element comprising a liquid crystal to optical communication, optical computation, an optical memory device such as hologram memory, an optical printer, and the like. Also, an optical switching element comprising a liquid crystal is subject to that problem that the utilization efficiency of light deteriorates due to polarizers.

Higher image quality has recently been demanded in image display devices, and thus there has been a demand for an optical switching element which permits more precise display of grayscale than an optical switching element using a liquid crystal.

SUMMARY OF THE INVENTION

Accordingly, an object of the present invention is to provide an optical switching element which permits high speed response with low loss of light. Another object of the invention is to provide an image display device which can be relatively simply manufactured with high yield, and which permits color display with high resolution at low cost. A further the object of the present invention is to provide an image display device which permits thinning of an optical system for illumination and which has precise grayscale characteristics.

In order to achieve the objects, the present invention provides an optical switching element comprising a light guide which permits extraction of light when a transmissive extraction surface is brought into contact with the light guide, and extraction of leaking evanescent light when the extraction surface is brought near the light guide at a distance of half a wavelength, preferably ¼ wavelength, therefrom, whereby light can be turned on and off at high speed by finely moving a light extraction unit provided with the extraction surface for about a wavelength or less. Namely, in accordance with the optical switching element of the present invention, the light guide has a total reflection surface capable of transmitting light by total reflection, and the light extraction unit has the transmissive extraction surface which can be moved between a first position at not more than the extraction distance from the total reflection surface, where evanescent light leaks, and a second position at not less than the extraction distance therefrom. Since the optical switching element is capable of extracting evanescent light, it does not necessarily require adhesion (close contact) to the total reflection surface of the light guide, and exhibits high reliability. An off state is caused by movement from the first position to the second position at a distance of about a wavelength from the total reflection surface, and it is thus possible to provide an optical switching element which can be operated at high speed. Also, in the off state, light from the light guide is totally reflected without leaking, and thus an optical switching element having high contrast can be provided.

In the optical switching element, the light extracted by the extraction surface may be appropriately processed by an emission member so that the light can be output to the outside, thereby permitting on-off operations. For example, at least one of an emission surface and a reflection surface at a different angle from the total reflection surface may be provided on the emission member so that the light extracted by the light extraction unit can be output to the outside. As such an emission member, a micro prism or micro lens can be used for efficiently outputting the light extracted by the extraction surface to the outside. As the emission member, it is possible to use an optical element having the shape of a truncated cone or truncated pyramid which expands in the emission direction. The use of such an optical element enables a further increase in the efficiency of light extraction, and the direction of the extracted light to be close to the direction perpendicular to the total reflection surface of the light guide.

Also a light scattering body can be used as the emission member o that the extracted light can be emitted to the outside by scattering by the emission member. Further, as the emission member, a member which can emit light by extracted light, for example, a member which uses ultraviolet light as light to be transmitted to the light guide unit, and which contains a fluorescent agent emitting light when the ultraviolet light is applied thereto, can be used.

Further, an optical switching element can be provided in which wavelength selectivity is imparted to the light extraction unit to develop different colors. For this purpose, the extraction surface or the emission member may be provided to function as a color filter, a material having wavelength selectivity may be used as a scattering material or a light emitting agent.

The light extraction unit may be a transmissive type in which extracted light is guided to the side opposite to the extraction surface. Such a transmissive extraction unit is disposed on the light emission side with respect to the light guide unit to function as an optical switching element. On the other hand, the light extraction unit may be a reflective type in which extracted light is guided to the extraction surface side, and such a reflective light extraction unit is disposed on the side opposite to the light emission side with respect to the light guide unit to function as an optical switching element. Also the light extraction unit may be an emissive type which emits light by the light extracted by the extraction surface. In cases where the extracted s scattered, or the light emitted by extracted light is emitted, a light absorbing layer is disposed on the side opposite to the emission side with respect to the light guide unit to absorb extraneous light, thereby improving contrast.

Further, a non-movable light processing unit may be provided on the emission side where the light extracted by the light extraction unit is emitted, and provided with a wavefront converting function, a wavelength selecting function or a light emitting or scattering function in place of the emission member having a scattering or wavelength selecting function and provided on the light extraction unit for switching operations. By providing such a light processing unit, it is possible to simplify the configuration of the light extraction unit, facilitate movement due to a decrease in the operation load, and enable high-speed switching operations.

In such an optical switching element, the light extraction unit may be separately supported so that it can be moved at a proper distance from the light guide. Where a thin film is laminated on the light guide with spacers therebetween, and the light extraction unit is supported by the thin film, it is possible to maintain an appropriate distance from the light guide, and unitize the light extraction unit. In the case of the transmissive light extraction unit, the light extraction unit can be supported by using a transmissive thin film laminated on the emission side through spacers. In the case of the reflective light extraction unit, the extracted light can be reflected by a reflective thin film laminated on the side opposite to the emission side through spacers. Also a reflective or non-transmissive thin film may be used for preventing extraneous light, thereby increasing a contrast.

In the optical switching element in which the light extraction unit is supported by a thin film, the light extraction unit supported by the thin film may be driven by using an appropriate driving mechanism to operate as a switching element. By providing a driving unit capable of driving directly or indirectly the light extraction unit supported by the thin film in the optical switching element, it is possible to provide the optical switching element with the driving mechanism integrated therein. As such a driving mechanism, an element having a piezoelectric conversion function, such as a piezo element or the like, may be used; however, the light extraction unit may be electrostatically driven by the driving unit so that electrostatic attraction or repulsion can be used, and a micro machine can be realized by using a thin film technique. This permits a thin type to be formed with a simple mechanism, and improves productivity. Therefore, a small optical switching element can be provided at low cost. For example, a transparent electrode can be provided on the total reflection surface, and an electrode opposite to this electrode can be provided so that the optical switching element can freely be controlled by applying a voltage thereto.

In the optical switching element in which the light extraction unit is supported by the thin film and electrostatically driven, the transparent electrode is preferably disposed on the light guide side with respect to the emission member for emitting light by optically processing the light extracted by the extraction surface. This can decrease the distance between the transparent electrode provided on the total reflection surface and the transparent electrode provided on the thin film side, and drive the optical switching element with a low driving voltage. When the thin film is made of silicon, electrostatic thermal junction to glass spacers can be made. The use of electrostatic thermal junction requires no adhesive layer, and thus further facilitates assembly in which the distance between the thin film and the total reflection surface is kept constant. Each of the spacers for defining the distance between the thin film and the total reflection surface has a prismatic form so as to support the light extraction unit at each of four positions around, thereby minimizing the arrangement space of the spacers, and securing the extraction surface having a wide area Where a plurality of optical switching elements in accordance with the present invention are used and arranged in a two-dimensional form, and the light guide is connected thereto so that light can be transmitted, an image display device capable of two-dimensional display can be realized. The image display device has a high response speed and can be operated at high speed, and can provide an image with a high contrast. The image display device can also express grayscale in a time division manner by utilizing the high-speed properties of the switching elements, and thus obtain a high quality image. Since light intensity is not decreased by a polarizing filter or the like, and light is extracted directly from the light guide, the image display device capable of displaying a bright image can be provided.

In such an image display device, the light extraction units are supported by the thin film laminated on the light guide through spacers, thereby making the device thin and small. In order to electrostatically drive each of the optical switching elements arranged in a two-dimensional form, it is possible to use a scanning electrode and a sub-scanning electrode perpendicular to the scanning electrode. These electrodes are disposed on the light guide and the thin film or the light extraction units so that an image can be displayed by driving each of the optical switching elements arranged in a two-dimensional form.

Also color display can be realized by imparting wavelength selectivity to the light extraction unit. Further, a light source capable of supplying light of the primary colors to the light guide in a time division manner can be used for permitting color display by synchronously controlling the respective optical switching elements. Therefore, the image display device of the present invention has the effect of obtaining a high quality color image and enabling thinning of the device.

DETAILED DESCRIPTION OF PREFERRED EMBODIMENTS

Embodiments of the present invention will be described below with reference to the drawings.

The principle of an optical switching element of the present invention lies in the characteristic that light is switched by switching a member comprising a transparent or transmissive extraction surface and provided opposite to a light guide comprising a glass plate or the like for transmitting light by total reflection between a first position at an extraction distance of a wavelength or less, preferably half a wavelength or less, where the member is brought near or-into-contract with the light guide by using electrostatic force or a magnetorestrictive effect to extract leaking evanescent waves, and a second position where total reflection conditions are not satisfied so as not to output the evanescent waves.

Figure 1:
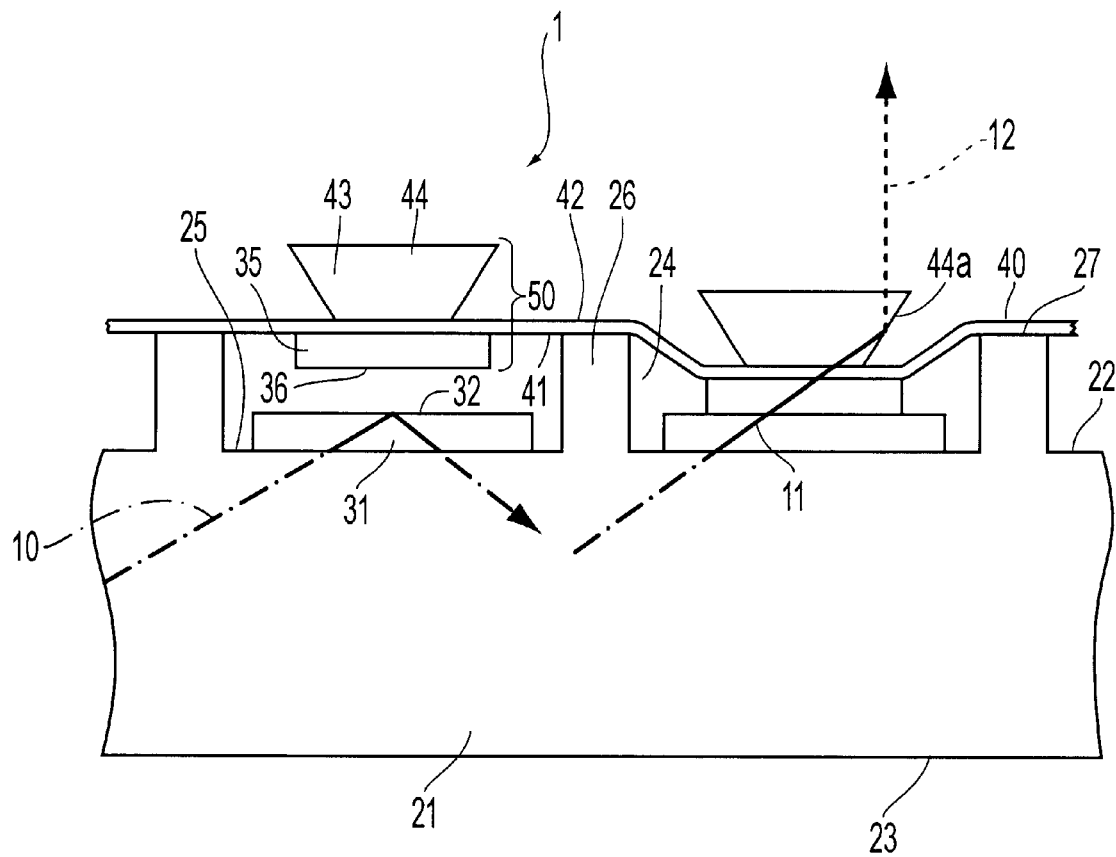
FIG. 1 is a drawing schematically illustrating the configuration of an optical switching element in accordance with embodiment 1 of the present invention.

FIG. 1 shows the schematic configuration of an optical switching element 1 in accordance with an embodiment of the present invention. This optical switching element 1 comprises a light guide 21 serving as a light guide body (light guide unit) having high light transmittance and made of glass or transparent plastic. The light guide 21 has a surface 22 and a back 23 which are formed at an appropriate angle for the angle of incidence of incident light 10 so that the incident light 10 is transmitted by total reflection. Irregularity 24 is formed on surface 22. The irregularity has an appropriate height and is formed by a technique such as etching or the like. Transparent electrode 31 having a thickness of about $0.1\mu$ is provided in a groove 25 so that a surface 32 of the transparent electrode 31 also serves as a surface (total reflection surface) for total reflection of the incident light 10. A transparent thin film 40 of a PET polymer film or an inorganic material is laminated on the surface 22 of the light guide 21 having the irregularity 24 formed thereon. The lands 26 of the irregularity 24 serve as spacers to keep the distance between the thin film 40 and the bottom of the groove 25 constant.

In the optical switching element 1, an electrostatic thermal junction (anodic junction) technique is used for connecting the thin film 40 and the light guide 21, in which a high potential is applied at an appropriate temperature. Therefore, an additional layer such as an adhesive layer need not be provided at the top 27 of each of the lands 26 where the thin film 40 and the light guide 21 are joined together, and thus a gap between the thin film 40 and the bottom of the groove 25 can precisely be maintained. A transparent electrode 35 is provided on the groove-side surface 41 of the thin film 40 so that when potentials with different polarities are applied to both transparent electrodes 35 and 31, the electrodes attract each other by electrostatic force, and the groove-side surface (extraction surface) 36 of the transparent electrode 35 is brought near or into contact with the surface 32 (total reflection surface) of the electrode 31 provided on the groove side to extract light from the light guide 21 by a light extraction unit 50. Namely, in this embodiment, the transparent electrode 35 constitutes part of the light extraction unit 50 and has surface 36 which serves as the extraction surface. Although the transparent electrodes 35 and 31 are provided with a known insulating layer made of silicon oxide of about $0.02\mu$, which is used for a liquid crystal display device and the like, detailed description thereof is omitted.

The light 11 extracted by the extraction surface 36 passes through the thin film 40 and an emission optical element (emission member) 43 provided on the opposite surface 42 of the thin film 40, and is emitted as outgoing light 12 to the outside. Therefore, in the optical switching element 1 of this embodiment, the transparent electrode 35 and the emission member 43 function as the light extraction unit 50. In this embodiment, the emission member 43 comprises a transparent micro prism 44 of a polymer or an inorganic material having a shape (truncated pyramid) in which the tip of a pyramid is truncated. The micro prism 44 is provided so that the bottom area on the side near the light guide 21 is smaller than the area on the opposite side. Therefore, the extracted light 11 guided to the micro prism 44 is reflected by the side 44a at a different angle from the total reflection surface, and emitted upward as the outgoing light 12 in the direction substantially perpendicular to the total reflection surface 32, i.e., the outgoing light 12 having a radiation distribution which is made perpendicular to the surface of the light guide 21.

Figure 2:
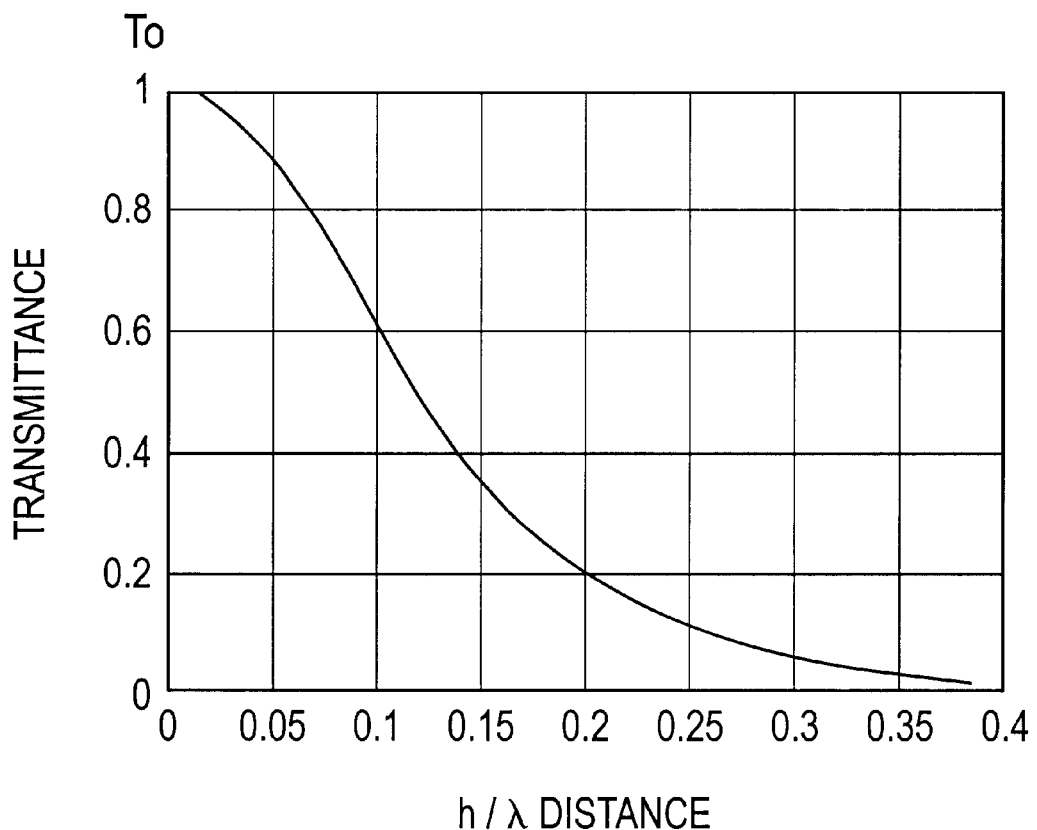
FIG. 2 is a graph showing the transmittance of evanescent waves against the distance.

It is known that when a transparent body is brought near the total reflections surface, evanescent waves leak to the transparent body side, and light is transmitted therethrough. FIG. 2 shows an example of transmittance. Although the transmittance of evanescent waves depends upon the refractive index of a medium and the angle of incidence, it shows substantially the same tendency, and evanescent waves can be extracted by bringing the transparent body near the total reflection surface at a distance of half a wavelength or less therefrom. Since the transparent electrode 31 which forms the total reflection surface 32 and the transparent electrode 35 which forms the extraction surface 36 have substantially the same refractive index, if these electrodes contact with each other, incident light passes through the extraction surface 36 from the light guide 21 serving as the light guide unit without total reflection by the total reflection surface 32, and travels as the extracted light 11 to the transparent electrode 35. Thus, the extracted light 11 can be obtained from the total reflection surface 32 directly or with the evanescent waves extracted, and thus output as the outgoing light 12 through the emission optical element 43.

As described above, it is known that when the transparent body having the extraction surface formed thereon is brought near the light guide unit for total reflection at a distance of a wavelength or less without contact therebetween, the evanescent waves leaking to external air or vacuum from the light guide unit in an amount of about a wavelength can be extracted to the transparent body side. The evanescent waves are light present due to slight penetration of totally reflected light from a medium with a high refractive index into a medium with a low refractive index when the phenomenon of total reflection is considered on the basis of the wave theory, the light being generally returned to the medium with a high refractive index to produce totally reflected light. In the optical switching element 1 of the present invention, since such leaking evanescent waves can also be extracted, the optical switching element sufficiently functions as an optical switching element even if the extraction surface 36 is not necessarily adhered to the total reflection surface 32, and an optical switching element having high reliability is realized.

On the other hand, where the distance between the total reflection surface 32 and the extraction surface 36 is about half a wavelength or more, the transmittance of the evanescent waves becomes substantially zero, without emission of light. Therefore, a switching element with high contrast can be realized. In the optical witching element 1 of this embodiment, the distance between the surface 32 of the transparent electrode 31 on the light guide side, which serves as the total reflection surface, and the surface 36 of the transparent electrode 35 on the thin film side, which serves as the extraction surface, is set to an appropriate value by controlling the height of the lands 26 serving as spacers. When voltages with different polarities are applied to both electrodes 31 and 35, both electrodes approach each other to cause leakage of the evanescent waves (first position). When no voltage is applied or the same potential is applied to both electrodes 31 and 35, the electrode surfaces 32 and 36 separate from each other to cause no leakage of the evanescent waves (second position). Therefore, it is necessary to precisely control the thickness of the portion of junction between the lands 26 and the thin film 40. From this viewpoint, the use of electrostatic thermal junction eliminates the need for an adhesive layer, and thus permits junction of the light guide 21 and the thin film 40 with high precision.

As described above, in the optical switching element 1 of this embodiment, on-off control can be made by controlling the polarities of the potentials applied to the transparent electrodes 31 and 35 to emit the incident light 10 of the light guide 21. The distance of movement of the light extraction unit 50 supported by the thin film 40 may be of the order of half a wavelength, and thus the optical switching element can be operated at an operational speed of as fast as $10^{-3}$ to $10^{-6}$ seconds or less. The transmittance of the light guide 21 can be switched from substantially 0% to 100% by moving the light extraction unit 50 for about a wavelength, and the optical switching element with very high contrast can be realized. Therefore, the optical switching element 1 of this embodiment permits time-division control with high resolution, and facilitates control of multiple grayscale.

The optical switching element 1 of this embodiment can be manufactured by using a semiconductor manufacturing technique or micro machine manufacturing technique which is suitable for fine processing, such as etching and the like, and thus the size of one switching element can be from tens to several hundreds $\mu$. Also the optical switching element 1 is an integrated element comprising a laminate of the thin film 40 and the light guide 21, and can be provided as an active switching element as a unit in which the electrodes 31 and 35 for driving the light extraction unit 50 are integrated. Therefore, it is easy to integrate a plurality of optical switching elements 1 at high density, and possible to realize a thin switching element for image display having high resolution, as described below in detail.

Figure 3:
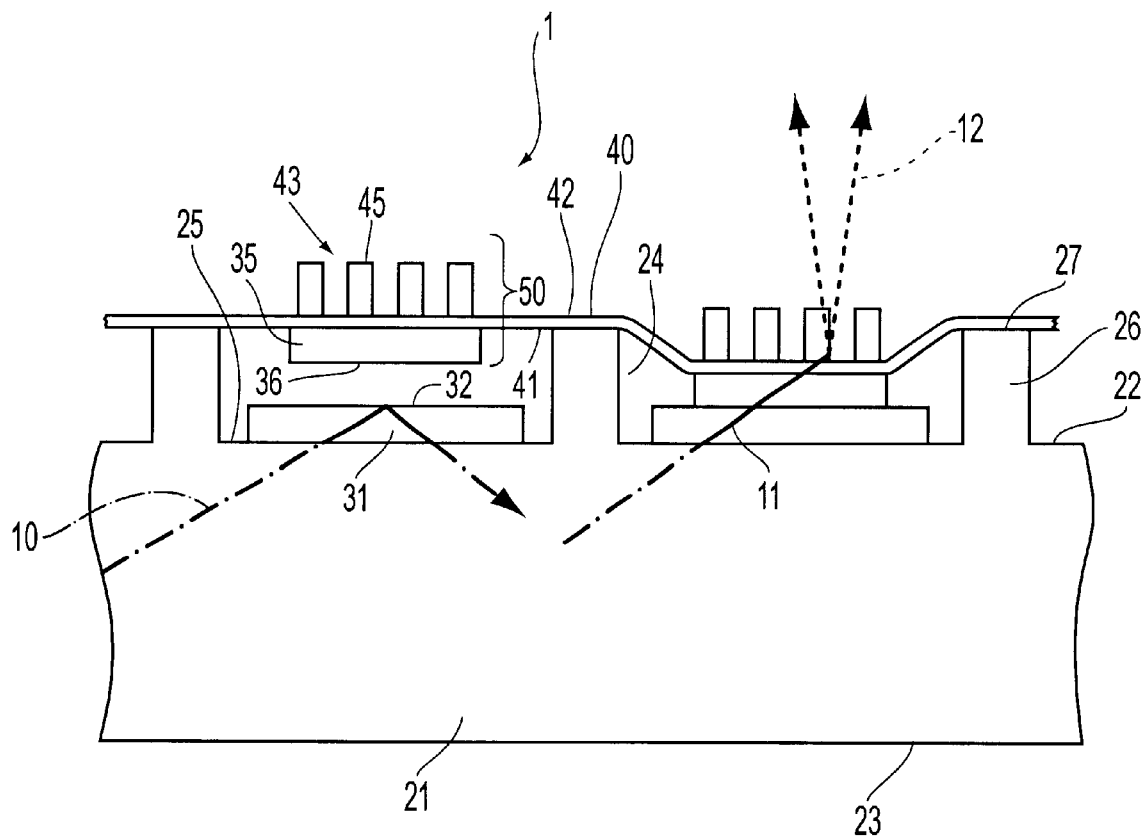
FIG. 3 is a drawing schematically illustrating the configuration of an optical switching element in accordance with embodiment 2 of the present invention.

FIG. 3 shows an optical switching element in accordance with another embodiment. The optical switching element 1 of this embodiment also comprises a light guide 21 having irregularity 24 formed on the surface thereof, and a thin film 40 laminated thereon. Portions common to the above portions are denoted by the same reference numerals, and are not described below. Also in each of the embodiments described below, the common portions are denoted by the same reference numerals, and are not described.

In the optical switching element 1 of this embodiment, a structure is employed as the emission member 43 in which a plurality of cylindrical or prismatic small transparent bodies 45, having a sectional area of several times to several tens of times as large as a wavelength, are arranged. Namely, when potentials with different polarities are applied to the transparent electrodes 31 and 35 to bring the extraction surface 36 near or into contact with the total reflection surface 32, the extracted light 11 enters the prismatic or cylindrical transparent bodies 45. The extracted light 11 is applied to the sides of the prismatic or cylindrical transparent bodies 45, and refracted and emitted to the outside or reflected and emitted upward to the outside. Therefore, scattered light can be obtained as the outgoing light 12. The efficiency of light extraction and the degree of scattering can be controlled by appropriately selecting the sectional area and the length of the cylindrical or prismatic transparent bodies 45.

Figure 4:
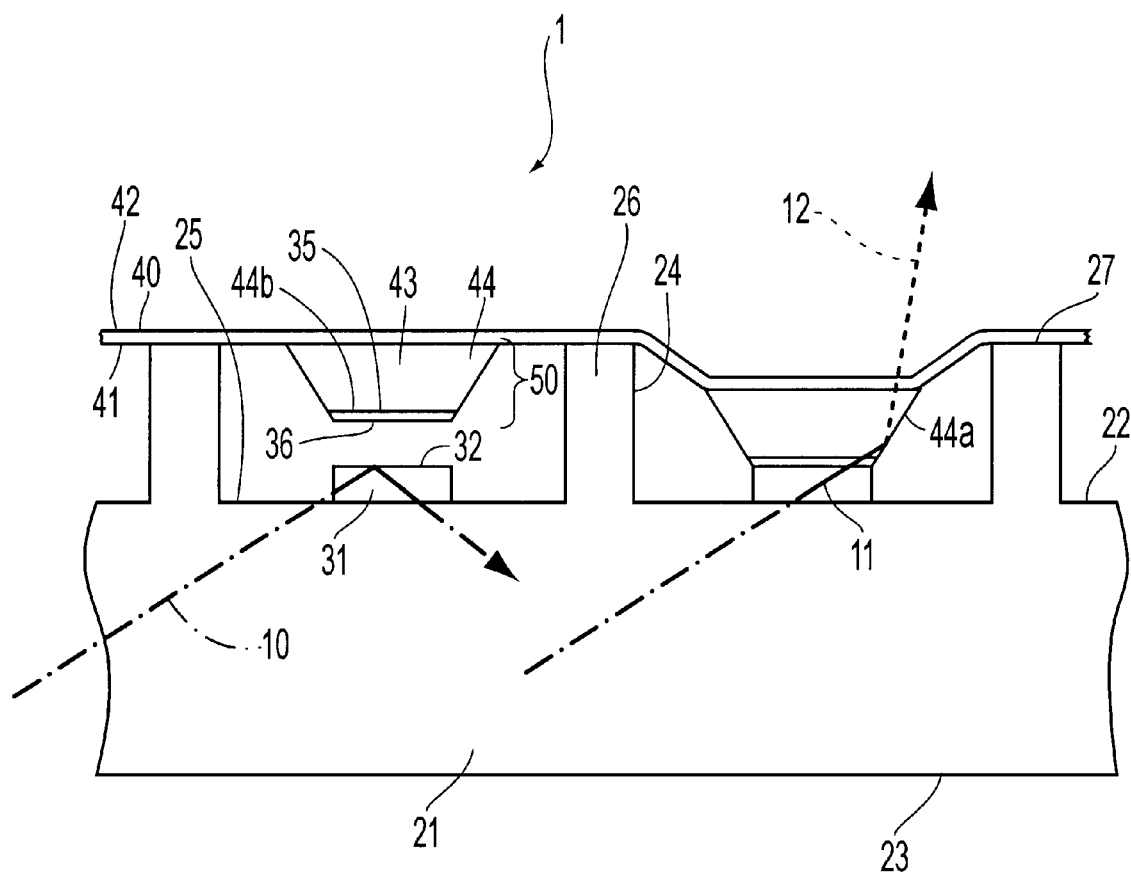
FIG. 4 is a drawing schematically illustrating the configuration of an optical switching element in accordance with embodiment 3 of the present invention.

FIG. 4 shows an optical switching element in accordance with still another embodiment. In the optical switching element 1 of this embodiment, the micro prism 44 functioning as the emission member 43 is provided on the lower side of the transparent thin film 40 which faces the light guide 21, i.e., on the extraction side thereof, and the transparent electrode 35 is provided at the top (the light guide side) 44b of the micro prism 44. Therefore, when a potential difference is applied to the electrodes 35 and 31 to bring the extraction surface 36 near or into contact with the total reflection surface 31, the incident light 10 propagating under total reflection by the light guide 21 is extracted when passing through the transparent electrode 35 and the micro prism 44 which constitute the extraction unit 50. The extracted light 11 is reflected by the side 44a of the micro prism 44 and emitted as the outgoing light 12 through the thin film 40 in the direction substantially perpendicular to the light guide 21.

Although the emission member 43 can be disposed between the thin film 40 and the groove 25 to form the optical switching element 1, as in this embodiment, the difference in height of the irregularity 24 formed on the surface 22 of the light guide 21 must be increased. Therefore, it is difficult to maintain the processing precision of the light guide 21. However, since the emission side of the optical switching element 1 is covered with the thin film 40, the optical switching element 1 provides the advantage that it can be superimposed on another optical device. Also since the transparent electrode 35 is provided on the light guide side of the emission member 43; if the distance between the thin film 40 and the bottom of the groove 25 is increased, the distance between the transparent electrodes 35 and 31 is not increased. Therefore, the distance between the electrodes 35 an 31 is small; the optical switching element 1 can be driven with a low driving voltage, and power consumption (operation power) can be decreased.

Figure 5:
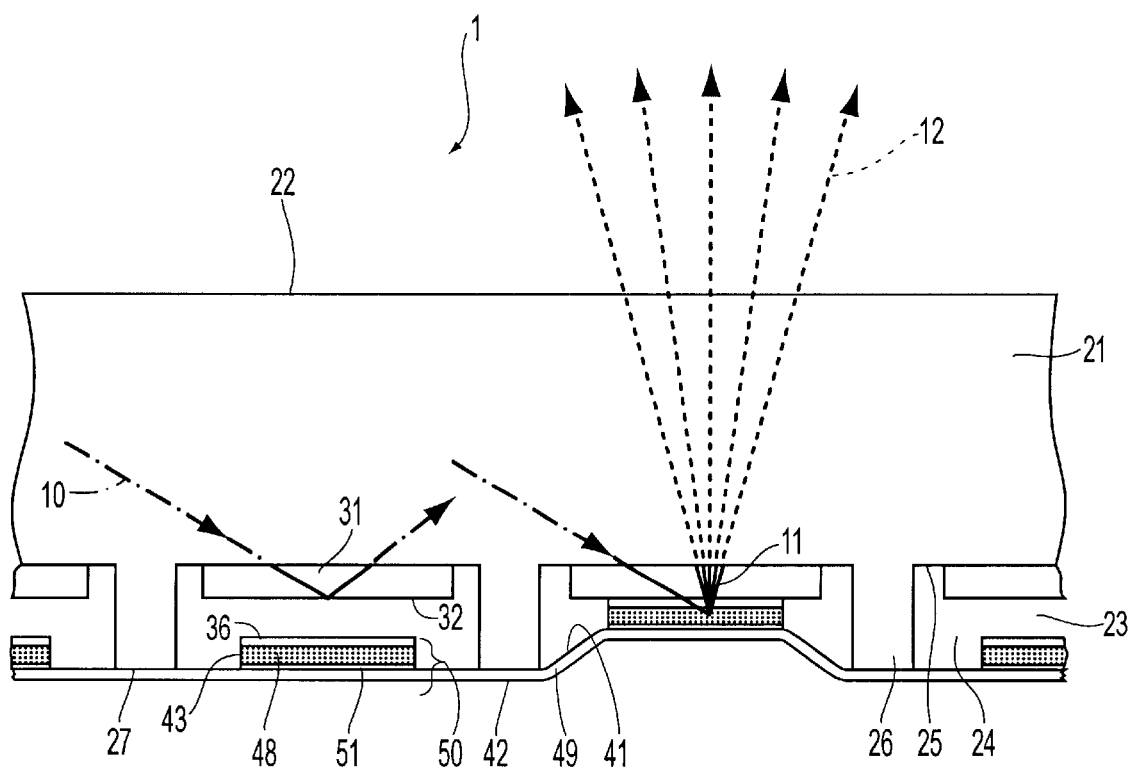
FIG. 5 is a drawing schematically illustrating the configuration of an optical switching element in accordance with embodiment 4 of the present invention.

FIG. 5 shows an optical switching element 1 in accordance with a further embodiment. Each of the above optical switching elements 1 comprises the transmissive light extraction unit 50 which reflects or refracts the extracted light 11 at appropriate gentle angles toward the upper portion of the drawing, i.e, the surface 22 of the light guide 21 on the emission side, to emit the light upward, and which is supported by the transparent thin film 40 on the emission side of the light guide 21. However, the optical switching element 1 of this embodiment comprises the reflective light extraction unit 50 which reflects at sharp angles the extracted light 11 extracted toward the lower side 23 (the side opposite to the emission side, i.e., the back side) of the light guide 21, and guides the outgoing light 12 upward to the emission side. The reflective light extraction unit 50 is supported by an opaque or reflective thin film 49 on the back side 23 of the light guide 21.

In the optical switching element 1 of this embodiment, the boron-doped silicon thin film 49 which can be thinned by etching is used, and laminated on the lands 27 formed on the back side 23 of the light guide 21 by electrostatic thermal junction. On the light guide-side surface 41 of the thin film 49 of the reflective light extraction unit 50 are laminated the transparent electrode 35, the emission member 43 containing a light scattering material 48, and an aluminum layer 51 as a reflecting film from the back side of the light guide 21.

Therefore, when potentials with different polarities are applied between the electrodes 31 and 35, the extraction surface 36 is brought near or into contact with the total reflection surface 32 to obtain the extracted light 11, as in each of the above optical switching elements. In the optical switching element 1 of this embodiment, the extracted light 11 is scattered in the emission member 43 containing the scattering material 48, and the outgoing light 12 scattered upward in the emission direction travels upward, passes through the light guide 21, and is emitted from the surface 22 of the light guide 21. The outgoing light 12 scattered downward is reflected upward in the emission direction by the aluminum reflecting film 51, and emitted through the light guide 21.

The optical switching element 1 of this embodiment can be formed by using the reflective light extraction unit 50 so that light can be emitted from the light guide 21, as in this embodiment. In this type of optical switching element, since light is emitted from the surface 22 of the light guide 21, another optical element such as a lens or the like can easily be disposed on the surface side. Also the use of the opaque boron-doped silicon thin film 49 can prevent entrance of extraneous light as a noise, and permits optical switching with high contrast. Further, even in the optical switching element 1 of this embodiment, the transparent electrode 35 is provided on the light guide-side of the emission member 43 containing the scattering material to minimize the distance between both electrodes 31 and 35 so that the optical switching element 1 can be driven at a high speed with low driving voltage.

As the scattering material 48 contained in the emission member 43, a dye having wavelength selectivity can be used. In this case, only light at a specified wavelength can be emitted by providing an absorptive film in place of the reflecting film, resulting in the realization of an optical switching element which enables color display.

Figure 6:
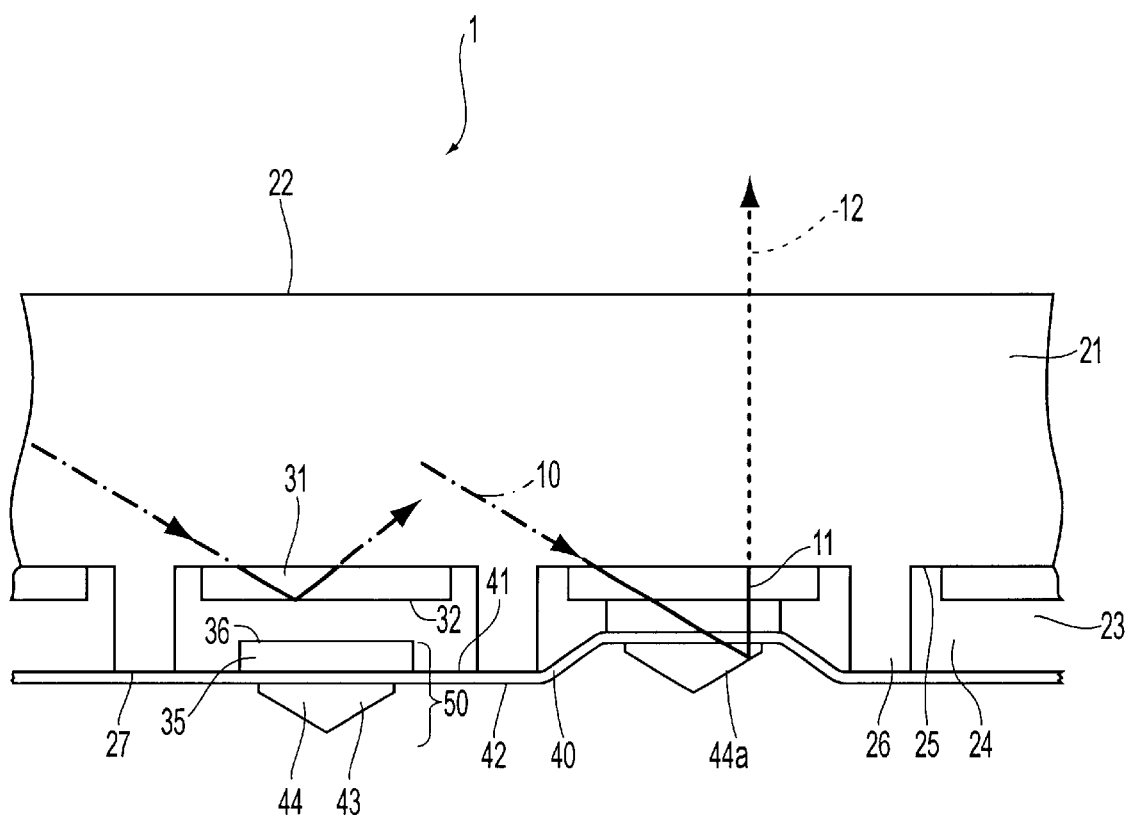
FIG. 6 is a drawing schematically illustrating the configuration of a an optical switching element in accordance with embodiment 5 of the present invention.

FIG. 6 shows an optical switching element 1 in accordance with a still further embodiment of the present invention. The optical switching element 1 of this embodiment comprises the reflective light extraction unit 50, but, in this embodiment, the reflective emission member 43 comprising the micro prism 44 or the like is provided on the outside 42 of the transmissive thin film 40. The reflective light extraction unit 50 can be formed by using the transmissive thin film 40, as in this embodiment. Also the light extraction unit 50 can be provided on the back side 23 of the light guide 21 to guide the outgoing light 12 to the back side 23 of the light guide 21. Further, an optical element having wavelength selectivity, such as a dichroic prism or the like, can be used as the micro prism 44 to provide an optical switching element capable of color display.

Figure 7:
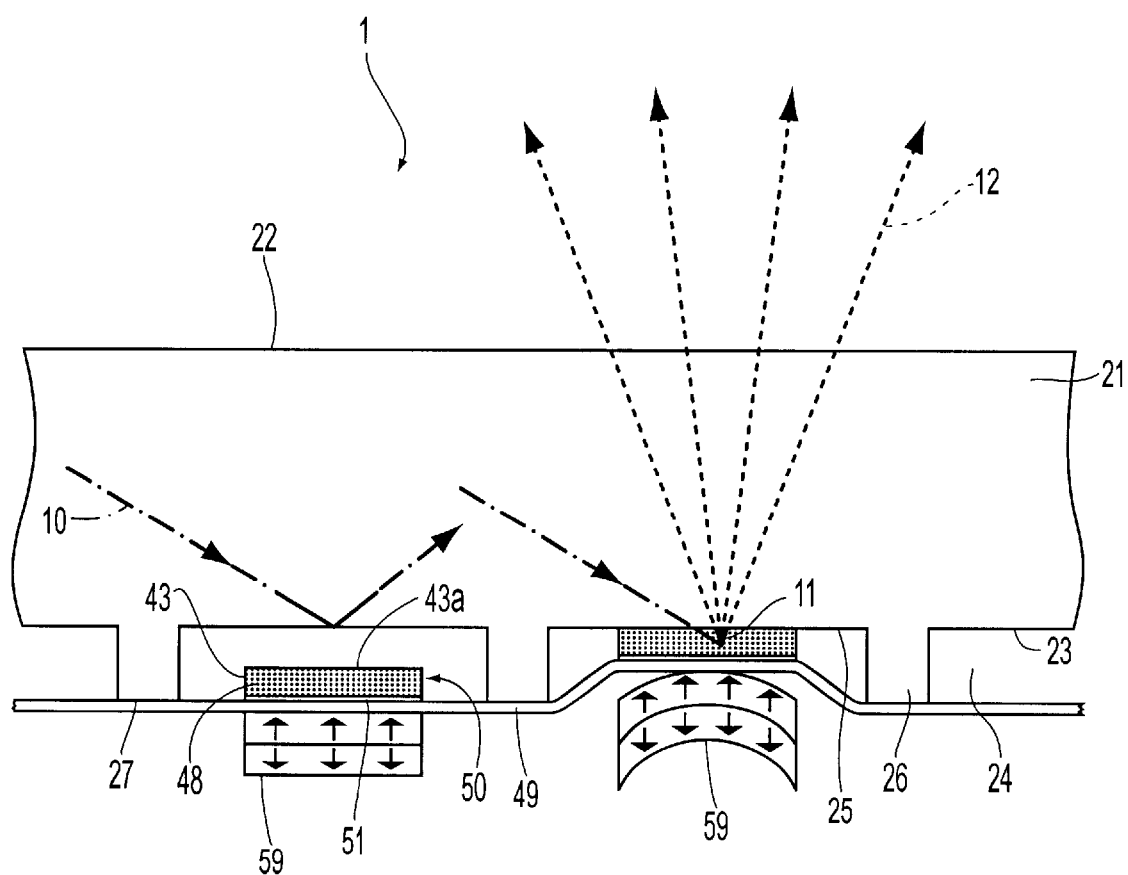
FIG. 7 is a drawing schematically illustrating the configuration of an optical switching element in accordance with embodiment 6 of the present invention.

FIG. 7 shows an optical switching element 1 in accordance with a further embodiment of the present invention. The optical switching element 1 of this embodiment comprises the reflective light extraction unit 50, and employs the electrostrictive force caused by a piezo element 59 in place of electrostatic force caused by electrodes as a mechanism for driving the light extraction unit 50. The piezo element 59 of this embodiment is a bimorph type in which two layers having different polarization directions are laminated, so that when a potential is applied, the piezo element 59 is curved to press the light extraction unit 50 toward the light guide 21 by the force of curvature.

In the optical switching element 1 of this embodiment, the light extraction unit 50 comprising the emission member 43 containing the scattering material 48 is supported by the boron-doped silicon thin film 49. When the piezo element 59 is curved to press the emission member 43 toward the light guide 21, the surface 43a of the emission member 43 contacts or approaches, as the extraction surface, the back side 23 of the light guide 21 for transmitting light by total reflection, and the incident light 10 is guided as the extracted light 11 to the emission member 43. The outgoing light 12 scattered in the emission member 43 passes through the light guide 21 and is emitted from the surface 22 of the light guide 21. Of course, the aluminum reflecting layer 51 may be provided between the emission member 43 and the thin film 49.

As described above, the optical switching element 1 of this embodiment can be driven by using a driving force other than electrostatic force. However, from the viewpoints of support and arrangement of the piezo element 59 as a driving member and power supply device, the use of electrostatic force caused by the electrodes can simplify the configuration, and facilitates formation of the optical switching element 1 as a unit.

Also where a plurality of light extraction units are assembled, of course, the light extraction units 50 can be assembled as movable units separated from the light guide 21 as the light guide unit. However, as shown in the above embodiments, the light extraction unit 50 is attached to the thin film 40 or 49, and the thin film is laminated on the surface of the light guide 21 having the irregularity 24 formed thereon, thereby simplifying utilization and maintaining an appropriate distance between the light extraction unit 50 and the light guide 21 with the lands 26 of the irregularity 24 as spacers therebetween. Therefore, it is possible to provide at low cost an optical switching element with high contrast and high performance which can be operated at high speed in accordance with the present invention.

Figure 8:
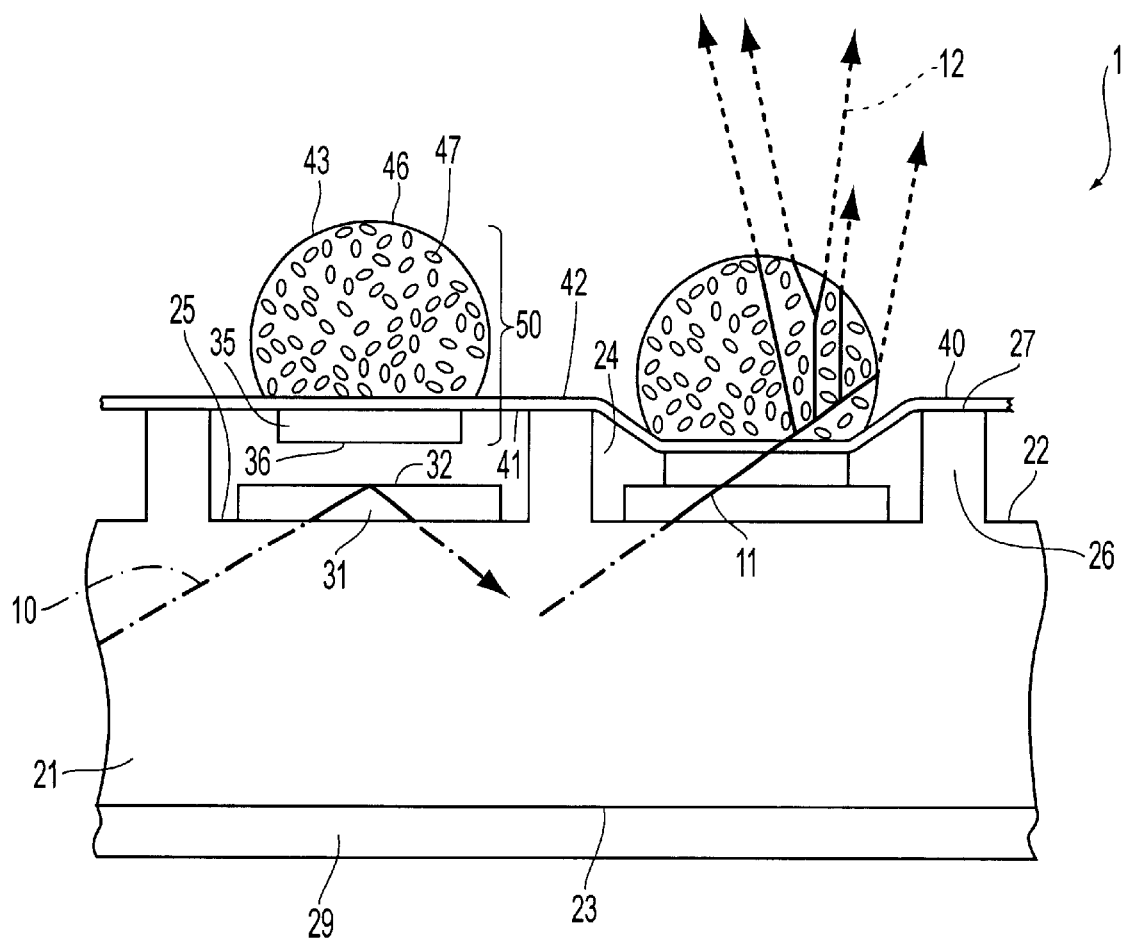
FIG. 8 is a drawing schematically illustrating the configuration of an optical switching element in accordance with embodiment 7 of the present invention.

FIG. 8 shows an optical switching element 1 in accordance with a further embodiment of the present invention. The optical switching element 1 of this embodiment comprises a substantially spherical micro lens 46 serving as the emission member 43. By using the micro lens having a shape closer to a sphere rather than a semisphere as the emission member, it is possible to correct the direction of the outgoing light 12 by refraction, and efficiently extract the light from the light guide to the outside thereof Further, in the optical switching element 1 of this embodiment, fused quartz which efficiently transmits ultraviolet rays having a wavelength of approximately 160 nm is used as the light guide 21 so that ultraviolet light is incident as the incident light 10 from a black light (ultraviolet light source). The emission member 43 contains a fluorescent agent 47 which emits fluorescence by ultraviolet light, so that the emission member 43 emits light as the outgoing light 12 by the extracted light 11. Namely, in the optical switching element 1 of this embodiment, the energy of ultraviolet light transmitted through the light guide 21 is extracted through the extraction surface 36, converted into visible light by the emission member and output. By selecting an appropriate material as the fluorescent material 47, color display can be realized by using ultraviolet light in the light extraction unit 50. As the fluorescent material, $(Y, Gd)BO_3:Eu^{3+}$ which emits red light, $BaAl_{12}P_{19}:Mn$ which emits green light, and $BaMgAl_{14}O_{23}:Eu^{2+}$ which emits blue light can be used. Grayscale made by using the optical switching element which can emit light of these primary colors permits high-resolution full color display.

In this embodiment, a light absorbing layer 29 is formed on the back side 23 of the light guide 21 so as to prevent entrance of light from the outside, thereby obtaining fluorescence with high contrast.

As described above, the optical switching element 1 of this embodiment comprises a self light emission type light extraction unit 50. However, scattering agent 48 can be contained in the emission member 43 in place of the fluorescent material 47 to provide a direct-sight type optical switching element comprising a scattering type light extraction unit, in which visible light is supplied to the light guide 21. Of course, it is possible to provide an optical switching element in which the incident light 10 is extracted and emitted by the transparent micro lens 46 having a shape close to a sphere.

Figure 9:
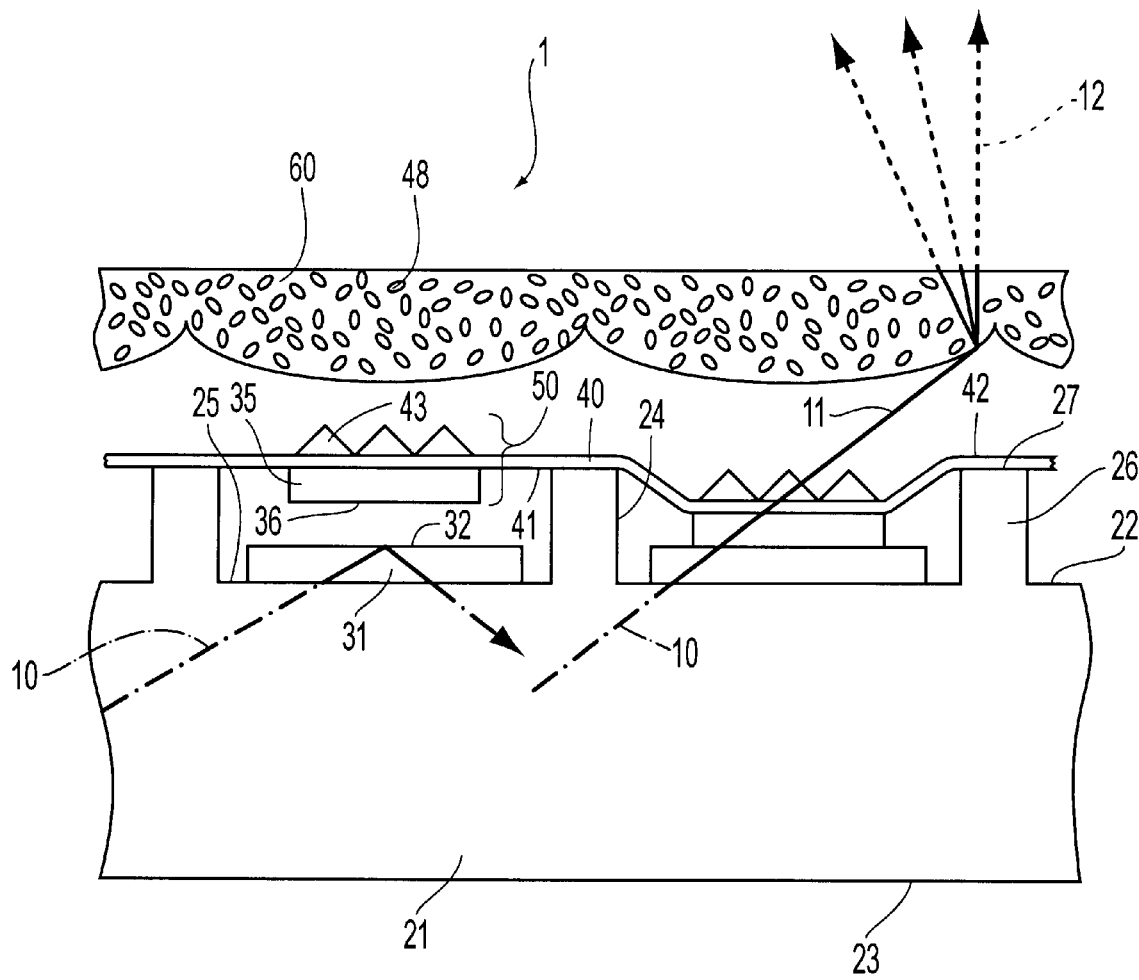
FIG. 9 is a drawing schematically illustrating the configuration of an optical switching element in accordance with embodiment 8 of the present invention.

FIG. 9 shows an optical switching element 1 in accordance with a further embodiment of the present invention. Although, in each of the above-described optical switching elements 1, the light extraction unit 50 comprises the emission member 43 so that the emission member 43 is moved with movement of the extraction surface, the optical switching element 1 of this embodiment comprises a light processing unit 60 not driven by the thin film 40 and provided on the emission side where the extracted light 11 extracted from the light guide 21 is emitted so that the extracted light 11 is processed (converted) to the outgoing light 12 by the light processing unit 60. The light extraction unit 50 of this embodiment only functions to extract the light 11 from the light guide 21, and can be formed in a very simple structure in which micro prisms are mounted to form a surface which causes no total reflection. Therefore, it is possible to significantly decrease the load for driving the light extraction unit 50, and provide an optical switching element which can be operated at a high speed with low power consumption and is capable of expressing multiple grayscale.

The light processing unit 60 can be formed separately from the light extraction unit 60 and can thus be provided with various functions. For example, the function as a micro lens for increasing the directivity of the outgoing light 12 can be imparted to provide a wavefront converting function. Since the light processing unit 60 can be provided separately from the light extraction unit 50, the light processing unit 60 having sufficient curvature can be provided. Also wavelength selectivity can be imparted by mixing the scattering material 48 which scatters a specified wavelength. Since movability need not be taken into consideration, the light processing unit 60 containing a sufficient amount of scattering material 48 can be provided. Of course, the light processing unit 60 containing a luminescent agent such as a fluorescent agent can be set so that light other than visible light such as ultraviolet light and the like can be processed. Further, the light processing unit 60 having a plurality of functions can be laminated so that the light 11 extracted from the light guide 21 can be appropriately processed and then emitted.

As described above in the optical switching elements in accordance with the embodiments of the present invention, in the optical switching element of the present invention, the totally reflected incident light is extracted and emitted, thereby causing less loss of light due to the polarizer, and efficiently extracting the incident light. Also since the distance of movement of the light extraction unit for turning on and off is as small as the unit of a wavelength or half a wavelength, it is possible to achieve high speed response and high contrast. Further, the optical switching element of the present invention can be manufactured by a general manufacturing method as a semiconductor manufacturing method or micro machine manufacturing method, such as etching or the like, and can thus be simply manufactured and provided in high yield and at low cost. Therefore, by arranging the optical switching elements of the present invention in a two-dimensional form, it is possible to provide an image display device capable of color display with high resolution. Some examples of such image display devices are described below. The portions which have been described above are denoted by the same reference numerals and are not described below.

Figure 10:
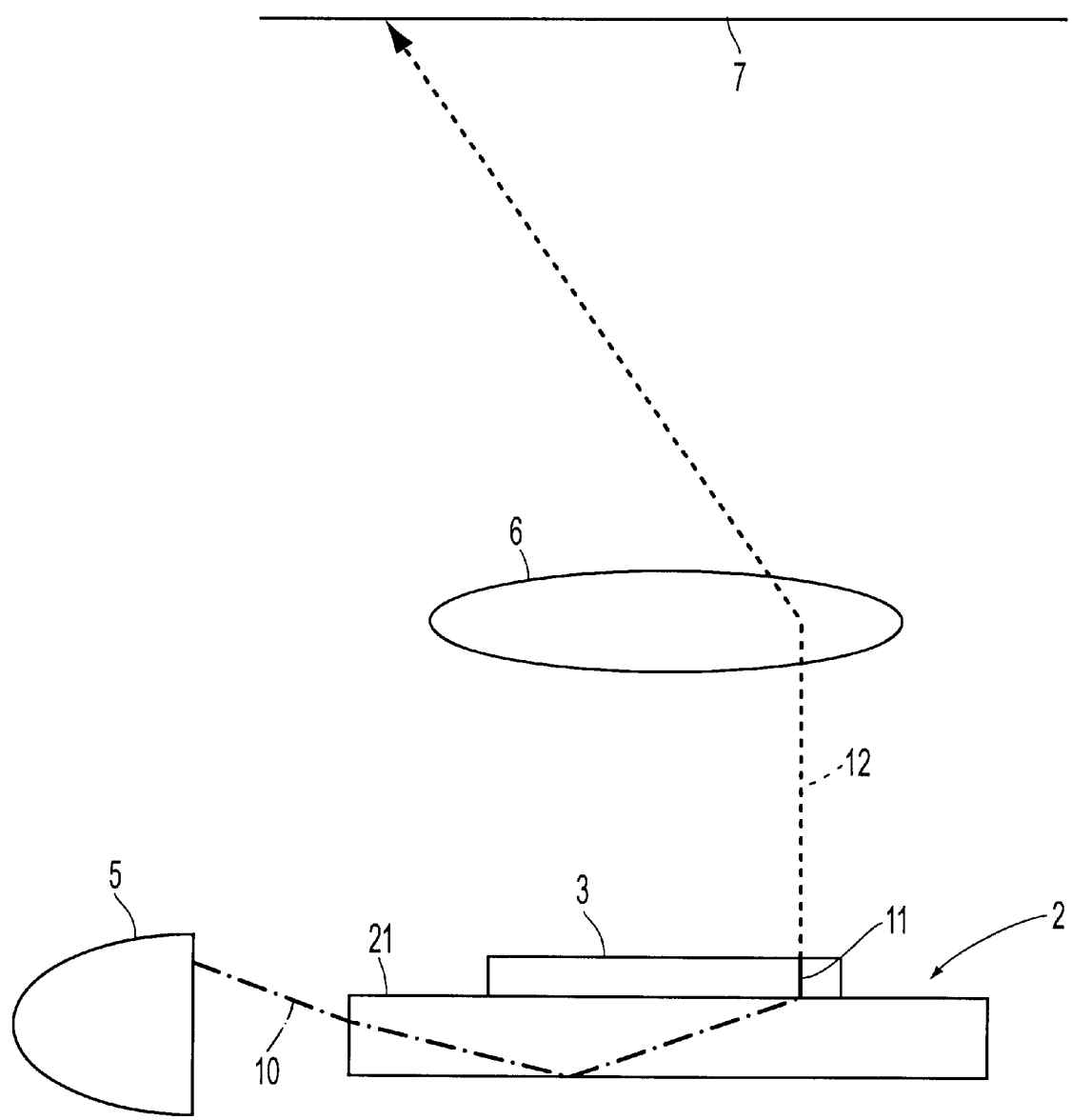
FIG. 10 is a drawing illustrating a state in which an image display device in accordance with embodiment 9 of the present invention is applied to a projection device.

FIG. 10 shows a state wherein an image is projected by using an image display device 2 of the present invention. The light emitted from a lamp 5 as a light source travels as the incident light 10 through the light guide 21 of the image display device 2 under total reflection, and reaches an optical switching unit 3 comprising a plurality of light extraction units 50 arranged in a two-diensional form. In the light extraction unit 50 arranged in a two-dimensional form, the light is extracted in a portion to which a voltage is applied, and emitted as the outgoing light 12. The outgoing light 12 is converged by a projection lens 6 and projected on a screen 7.

Figure 11:
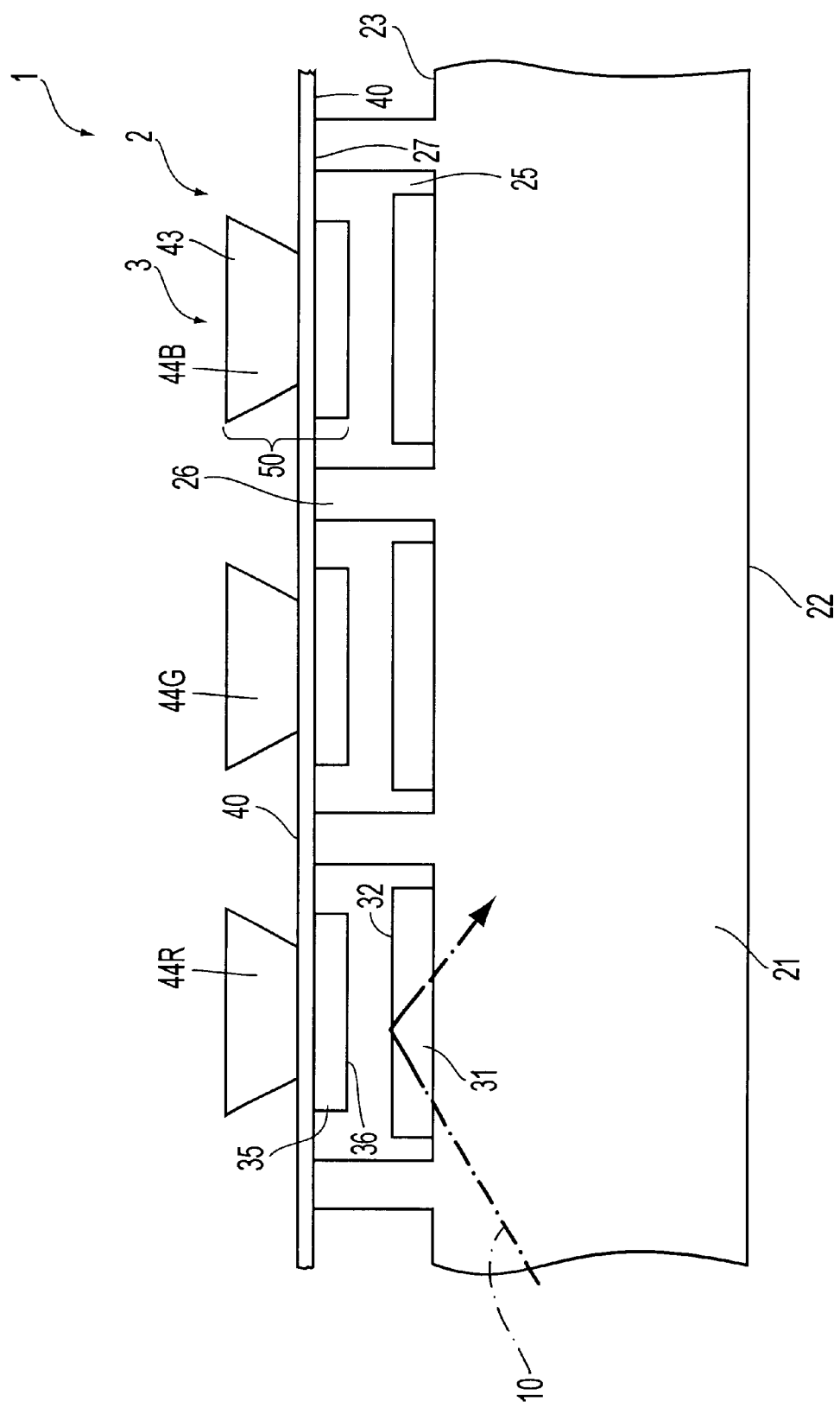
FIG. 11 is a drawing illustrating the schematic configuration of the image display device shown in FIG. 10.

FIG. 11 shows the optical switching unit 3 of the image display device 2 in accordance with an embodiment of the present invention. The optical switching unit 3 of this embodiment has a structure in which many switching elements of embodiment 1 are arranged in a two-diensional form. In the switching unit 3 of this embodiment, the optical switching elements respectively comprising the microprism 44 serving as the emission members 43, which constitute the light extraction units 50, a prism 44R having wavelength selectivity to transmit red light, a prism 44G having wavelength selectivity to transmit green light, and a prism 44B having wavelength selectivity to transmit blue light are arranged in order to permit full color display in one pixel comprising a group of these three optical switching elements.

In the switching unit 3 of this embodiment, grayshading can be made by adjusting the application time of the voltage applied to the electrodes 31 and 35 of each of the optical switching elements 1. In gray tone display as an example, black is not extracted from the light guide 21 because the application time is zero, while white is extracted for the longest time because of the minimum application time. Intermediate grayscale can be expressed by adjusting the application time. Such grayscale control is performed for each of the switching elements respectively comprising the prisms 44R, 44G and 44B for the three colors to achieve full color display. Further, since the switching elements of the present invention can be driven at high speed, and multiple grayshading can be achieved, full color expression with high resolution can be made.

Besides the micro prism 44, the wavelength selectivity may be realized by providing a color filter near other portions through which light is transmitted, e.g., the transparent electrodes 35. Also the wavelength selectivity may be realized by manufacturing the micro prism 44 comprising a dye dispersed in a transparent resin, or forming a dichroic mirror comprising a dielectric multi-layered film near the transparent electrodes. In this way, various methods can be used.

Figure 12:
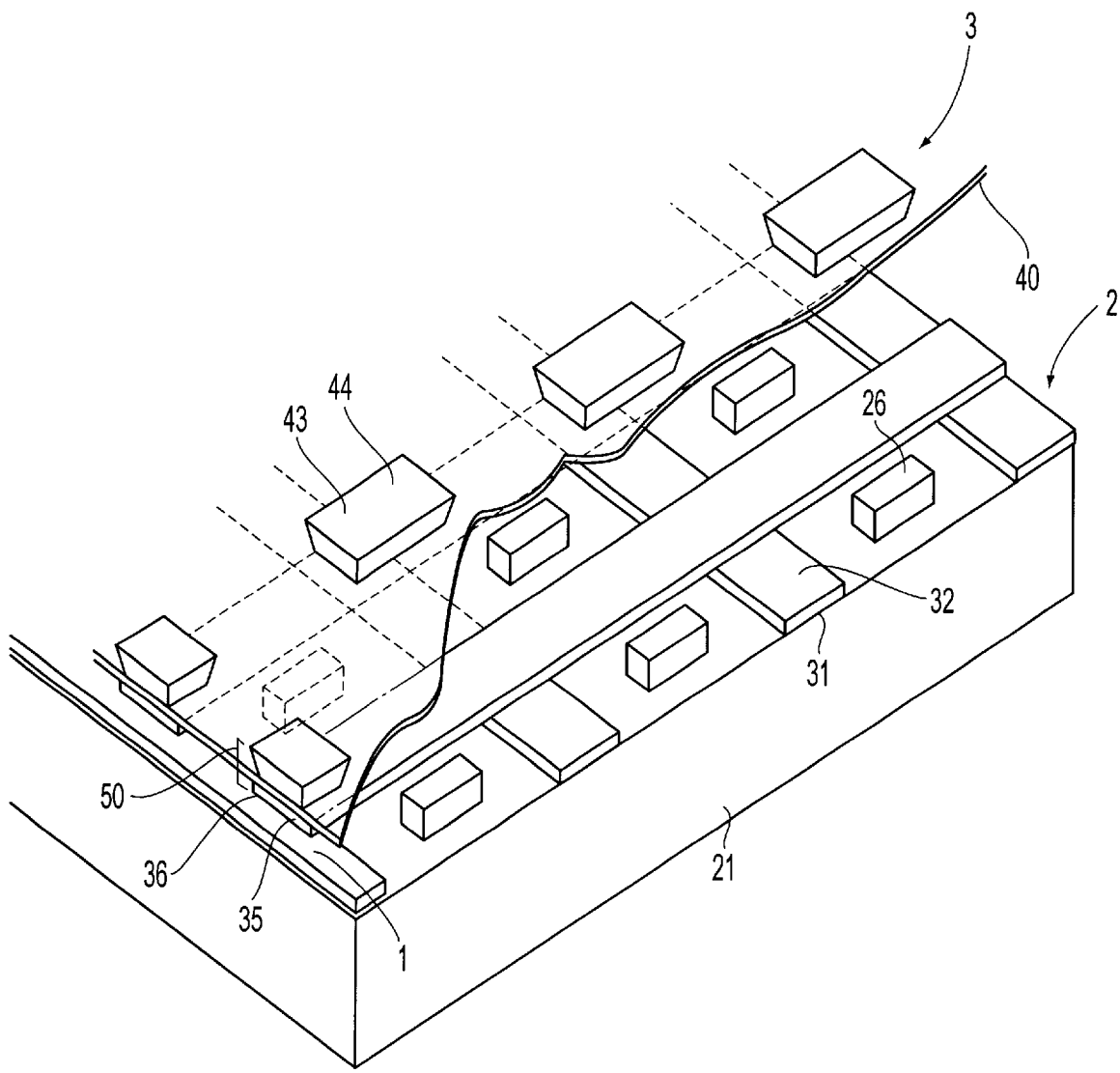
FIG. 12 is a partially cut-away perspective view illustrating the image display device shown in FIG. 10.

FIG. 12 shows a schematic configuration of the switching unit 3 of the image display device 2 of the present invention, with the thin film 40 partially cut away. The switching unit 3 of this embodiment comprises the switching elements 1 arranged in a two-dimensional form. Therefore, the transparent electrodes 31 extending in the scanning direction are arranged at the predetermined pitch in the light guide 21, and the transparent electrodes 31 extending in the sub-scanning direction perpendicular to the scanning direction are arranged at the predetermined pitch. The scanning direction and the sub-scanning direction may be reversed. The micro prisms 44 serving as the emission members 43 are provided at the intersections of the transparent electrodes 31 and 35 to form the optical switching elements 1 each comprising the light extraction unit 50. In this embodiment, the lands (projections) 26 for supporting the thin film 40 are formed in a prismatic shape around each of the optical switching elements 1 to support each of the light extraction units 50 at four positions around, the lands 26 being strongly joined to the thin film 40 by a method such as electrostatic thermal junction without interference with the electrodes 35. Since each of the movable light extraction units 50 is supported at four positions around, it is possible to secure a wide area for the extraction surface (the surface of each electrode 35) in contact with the surface 32 of each of the transparent electrodes as the total reflection surface. Therefore, it is possible to obtain the extracted light with high intensity from the light guide 21 in each of the light extraction units 50, and form the image display device 2 capable of displaying a bright image.

Figure 13:
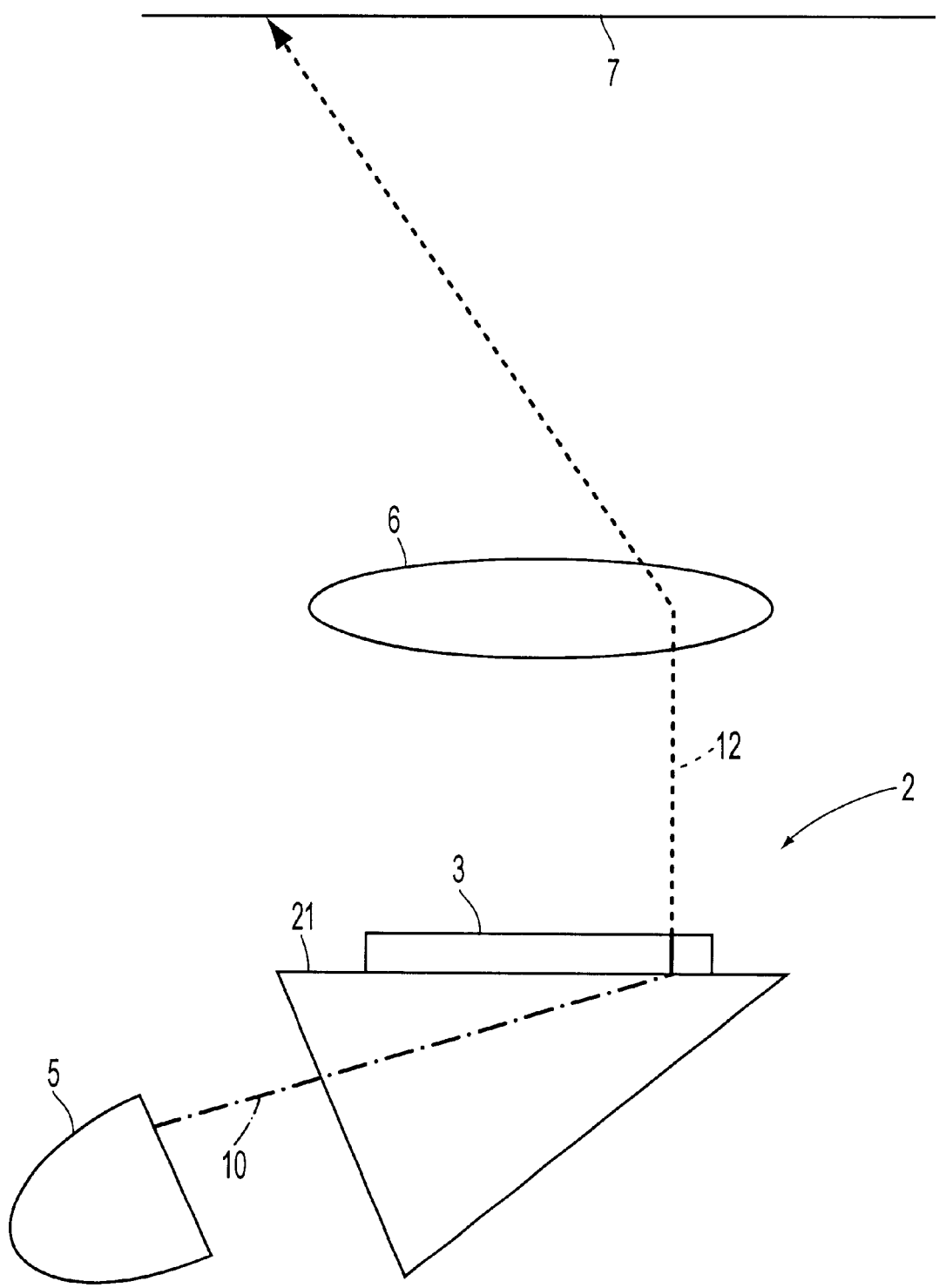
FIG. 13 is a drawing illustrating another example in which an image display device in accordance with embodiment 10 of the present invention is applied to a projection device.

FIG. 13 shows an image display device in accordance with another embodiment of the present invention. The image display device 2 of this embodiment comprises the prismatic light guide 21 so that the incident light 10 from the light source 5 is applied directly to the total reflection surfaces of the optical switching unit 3. The use of such an image display device 2 eliminates the need for setting the direction of the incident light 10 to be perpendicular to the emission direction. Therefore, in an applied apparatus comprising the light source 5 and the image display device 2, such as a projector or the like, the direction of the light source 5 and the image display device 2 can be set at an appropriate angle, and thus a compact projector or the like conforming to the operation state can be provided.

Figure 14:
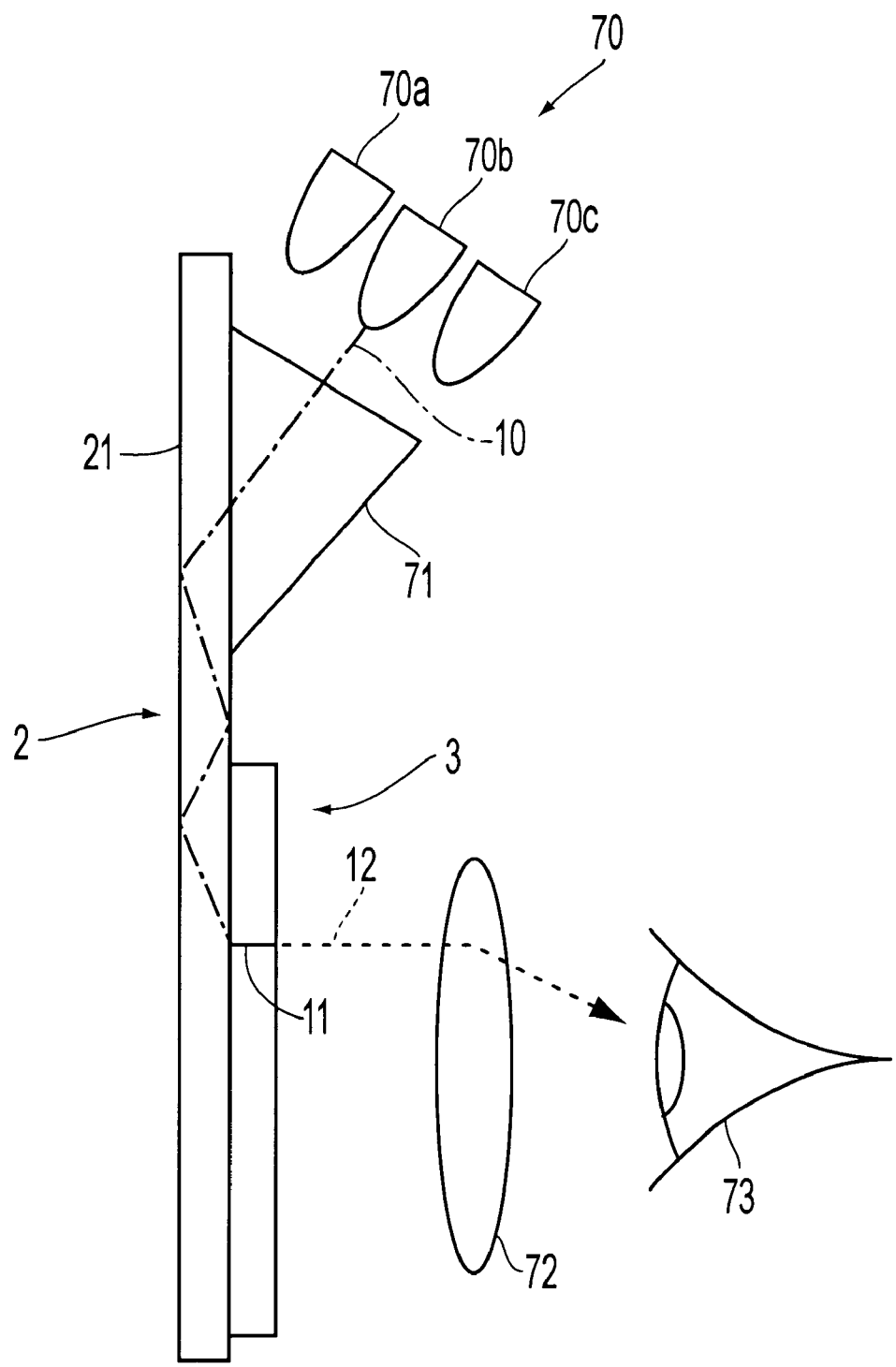
FIG. 14 is a drawing illustrating an example in which an image display device in accordance with embodiment 11 of the present invention is applied to a headmounted display.

FIG. 14 shows the use of an image display device in accordance with an embodiment of the present invention. In this embodiment, the image display device 2 is applied to a head-mounted display. The light emitted from LED 70 serving as a light source enters as the incident light 10 a prism 71 mounted on the light guide 21 of the image display device 2, and travels through the light guide 21 under total reflection. The light 10 is switched by the optical switching unit 3 to form an image which reaches the eye 73 through a converging lens 72. In this embodiment, the optical switching unit 3 comprises a scattering type light extraction unit suitable for direct vision, for example, the light extraction unit described above in embodiment 2.

The LED 70 as the light source for the image display device 2 comprises three types of LED 70a, 70b and 70c which can emit light of the primary colors such as red, green and blue, or cyan, magenta and yellow so that time-division luminescence of each of the LEDs causes incidence of light of the corresponding color on the image display device 2. Therefore, in the switching unit 3 of the image display device 2, the optical switching elements for displaying respective dots are respectively operated to express the colors in synchronism with the times of luminescence of the LED 70a, 70b and 70c, to display a full color image.

It is also possible to provide an image display device for head-mounted display capable of full color display by using a scattering type light extraction unit with wavelength selectivity, e.g., the optical switching element described in embodiment 4, 6 or 8. Where the light extraction unit having wavelength selectivity is used, a white light source can be selected as the light source. Therefore, an image can be displayed by incidence of external light in which the directivity is controlled by using an appropriate optical system. An image display device capable of displaying a color image by using an optical switching element comprising an emissive light extraction unit, as described in embodiment 7, can also be provided. embodiment 12.

Figure 15:
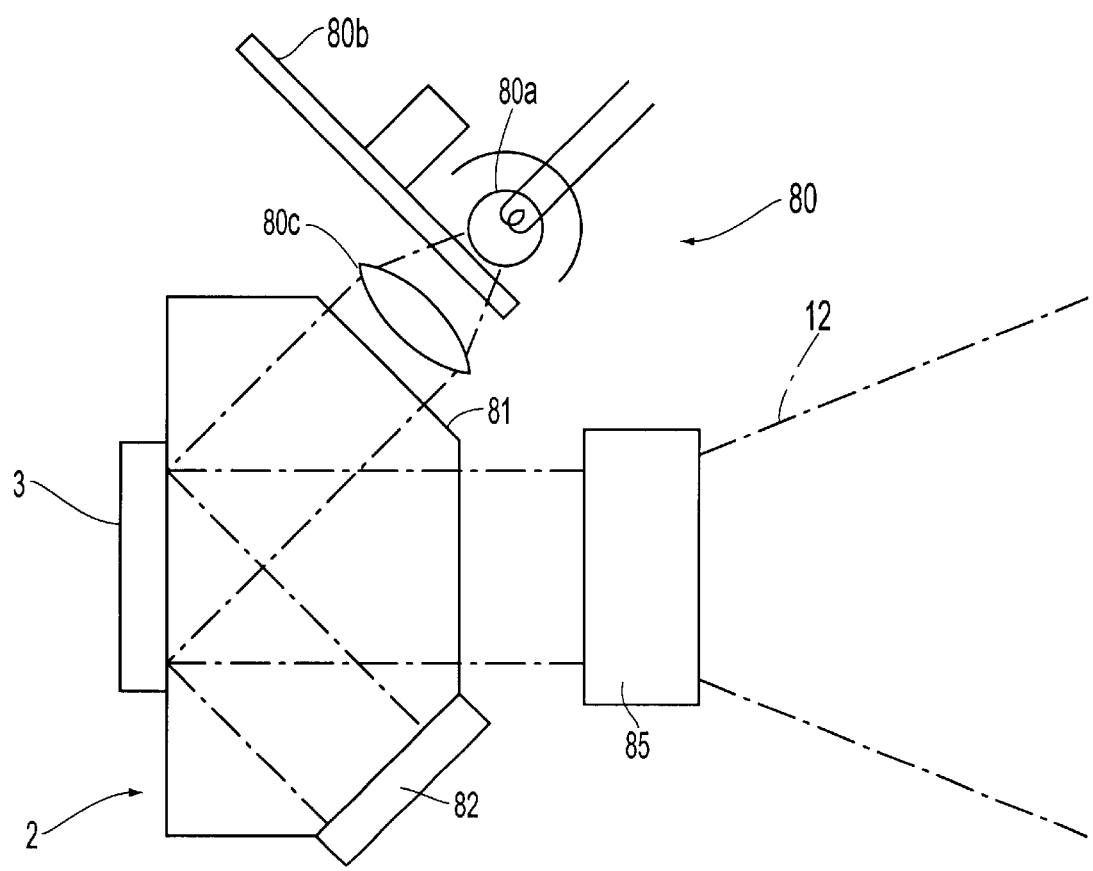
FIG. 15 is a drawing illustrating a further example in which an image display device in accordance with embodiment 12 of the present invention is applied to a projection device.
Figure 16:
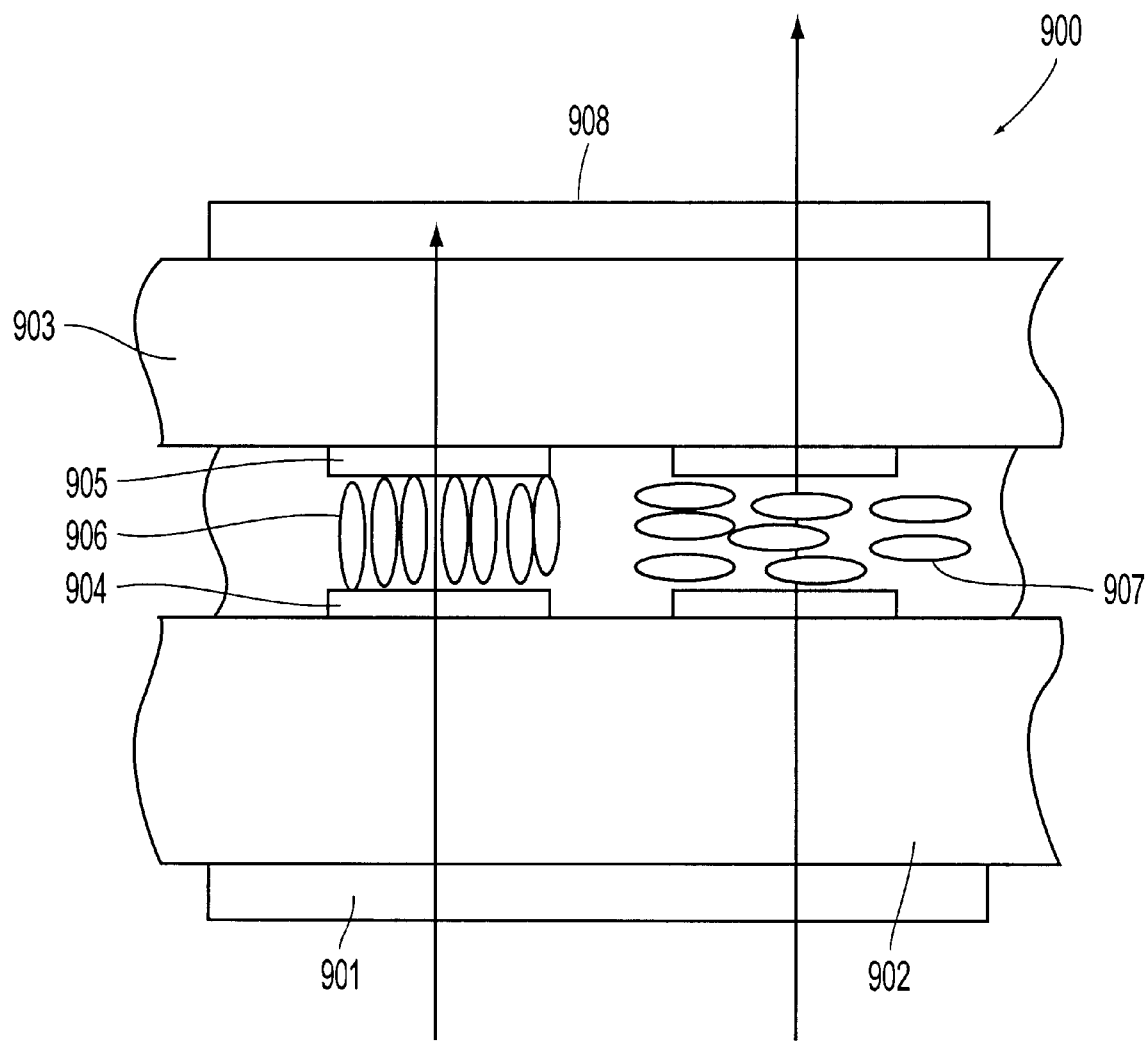
FIG. 16 is a drawing illustrating a conventional optical switching element using a liquid crystal.

FIG. 15 shows a projection type image display device in accordance with another embodiment of the present invention. Although, in embodiments 10 and 11, the optical switching element comprising the transmissive light extraction unit is used, the switching unit 3 of the image display device 2 of this embodiment comprises reflective light extraction units. For example, the optical switching element described in embodiment 5 can be used. In this embodiment, the light guide 21 of the image display device 2 has an incident surface 81 on which light of the primary colors such as red, green and blue (RGB), or cyan, magenta and yellow are incident from a light source in a time vision manner. In this embodiment, the light source 80 comprises a white metal halide lamp 80a, and a three color division filter 80b rotated by a motor so that light subjected to color division by the three color division filter 80b is converged through a collimator lens 80c to form a parallel light flux which is incident on the incident surface 81 of the light guide 21. The incident light 10 reaching the optical switching unit 3 is reflected by the optical switching elements, passes through the light guide 21 and is emitted as the outgoing light 12 to form an image on a screen through a projection lens 85. On the other hand, part of the incident light not converted into the outgoing light by the optical switching elements of the optical switching unit 3 reaches a reflection surface 82 of the light guide 21 on the side opposite to the incident surface 81 by total reflection, is reflected by the reflection surface 82, again transmitted through the light guide 21 and reaches the optical switching unit 3.

In this way, the image display device 2 of this embodiment can project a color image by operating the optical switching unit 3 synchronously with the incident light subjected to time division. Like in the above-described image display device comprising the transmissive optical switching unit, a color image can also be displayed by the optical switching unit 3 comprising the light extraction units with wavelength selectivity using white light as the incident light 10.

The above-mentioned optical switching elements and image display devices are only embodiments of the present invention, and of course the present invention is not limited to these embodiments. The optical switching element of the present invention can also be applied to apparatus other than those discussed above, which use a laser as a monochrome light source. The application of the optical switching element of the present invention is not limited to the image display device, and the optical switching element can be widely applied to a linear light valve for a light printer, a light space modulator for three-dimensional hologram memory, and the like. The optical switching element of the present invention is particularly suitable for not only the field of application of conventional optical switching elements comprising a liquid crystal, but also fields and applied apparatus in which an optical switching element comprising a liquid crystal exhibits an insufficient operational speed and light intensity. Further, the optical switching element of the present invention can be finely processed and can thus be made small and thin, as compared with a conventional optical switching element comprising a liquid crystal, and higher integration can also be attained.

As described above, in the optical switching element of the present invention, the lightweight extraction unit can be operated as a movable unit in a movement range of as small as approximately a wavelength or less to extract light sealed by total reflection. Thus, a response speed of 1 millisecond or less can be obtained, and when the switch is turned off by separating the light extraction unit from the total reflection surface, no light is output because of total reflection of light. It is thus possible to obtain an optical switching element having very high contrast. In addition, not needing for a polarizer enables a decrease in light loss, and the optical system for illumination can be made small and thin.

As the emission member for emitting the extracted light, various structures can be used, as described above. For example, by using a micro prism or micro lens, the outgoing light can efficiently be emitted. By using a transparent body having a shape in which the tip of a substantially cone or pyramid is truncated, and the bottom area near the light guide is smaller than that on the opposite side, it is possible to increase the emission efficiency and control the direction of the outgoing light in a predetermined direction.

Further, when the light extraction unit is supported by a thin film which is laminated on the light guide, and a structure for generating electrostatic force is used as a mechanism for driving the light extraction unit, an integrated optical switching element can easily be constructed and manufactured by a thin film technique, and micro machine technique. Therefore, a small, thin optical switching element with higher reliability can be provided at low cost.

Also the optical switching elements of the present invention can be arranged in a two-dimensional form for image display. Since no light is emitted due to total reflection when the optical switching elements are turned off, an image display device with high contrast can be provided. Further, grayscale can be expressed by controlling the application time of a voltage in the optical switching elements of the present invention which have a high operational speed, and thus grayscale with higher precision than grayscale expressed by controlling the voltage level in a liquid crystal display or the like can be realized by digital signal processing. Further, since the optical switching element can be utilized by guiding light into the light guide, the illumination optical system of the image display device of the present invention can be simplified, and the image display device can be applied to various apparatus such as a projector and head-mounted display having a simple configuration.

Also a full color display can be made by imparting wavelength selectivity to the light extraction unit or supplying, as incident light, light of the primary colors subjected to time division. Since the optical switching element of the present invention permits emission of light with high intensity, high-speed operation and multiple grayscale control, an image display device capable of high-quality color display can be provided.

What is claimed is:

1. An optical switching element, comprising:
a light guide unit having a total reflection surface that can transmit light by total reflection;
a light extraction unit having a transmissive extraction surface, the transmissive extraction surface being movable between a first position at or less than an extraction distance from the total reflection surface such that an evanescent wave can leak, and a second position greater than the extraction distance from the total reflection surface, the light extraction unit being a reflection type which guides extracted light to the transmissive extraction surface, the light extraction unit being provided on a side opposite to an emission side of the optical switching element relative to the light guide unit; and
a spacer and a reflective thin film laminated on the side opposite to the emission side of the optical switching element relative to the light guide via the spacer so that the light extraction unit is supported by the reflective thin film.

2. The optical switching element according to claim 1, the light extraction unit further comprising an emission member that emits light extracted by the transmissive extraction surface.

3. The optical switching element according to claim 2, the emission member comprising at least one of an emission surface and a reflection surface which is disposed at an angle relative to the total reflection surface.

4. The optical switching element according to claim 2, the emission member comprising at least one of a micro prism and a micro lens.

5. The optical switching element according to claim 2, the emission member comprising an optical element shaped as at least one of a truncated cone and a truncated pyramid which expands in an emission direction.

6. The optical switching element according to claim 2, the emission member having a light scattering ability.

7. The optical switching element according to claim 2, the emission member emitting light by the extracted light.

8. The optical switching element according to claim 7, the emission member including a fluorescent agent.

9. The optical switching element according to claim 1, the light extraction unit having wavelength selectivity.

10. The optical switching element according to claim 1, the light extraction unit being of at least one of a scattering type which scatters extracted light extracted by the transmissive extraction surface, and an emission type which emits light by extracted light, and a light absorbing layer is disposed on a side opposite to an emission side of the optical switching element relative to the light guide unit.

11. The optical switching element according to claim 1, further comprising a static light processing unit provided on an emission side of the optical switching element where extracted light extracted by the light extraction unit is emitted.

12. The optical switching element according to claim 11, the light processing unit having a wavefront converting function.

13. The optical switching element according to claim 11, the light process unit having a wavelength selecting function.

14. The optical switching element according to claim 11, the light processing unit having at least one of a scattering and light emitting function.

15. The optical switching element according to claim 1, further comprising a spacer and a thin film laminated on the light guide unit via the spacer so that the light extraction unit is supported by the thin film.

16. The optical switching element according to claim 15, further comprising a driving unit that can drive the light extraction unit supported by the thin film.

17. The optical switching element according to claim 16, the driving unit being capable of electrostatically driving the light extraction unit.

18. The optical switching element according to claim 17, further comprising a transparent electrode provided on the total reflection surface.

19. The optical switching element according to claim 17, the light extraction unit further comprising an emission member that emits light extracted by the transmissive extraction surface, and a transparent electrode is provided on a light guide side of the emission member.

20. The optical switching element according to claim 17, the spacer having a prismatic shape for supporting the light extraction unit at each of four positions.

21. The optical switching element according to claim 17, the thin film being joined to the spacer by electrostatic thermal junction.

22. An image display device comprising a plurality of optical switching elements, each of the optical switching elements having a structure according to claim 1, the optical switching elements being disposed in a two-dimensional form, the light guide unit of each of the optical switching elements being connected to transmit light.

23. The image display device according to claim 22, further comprising a spacer and a thin film laminated on the light guide unit of each of the optical switching elements via the spacer, for supporting the light extraction unit of each of the optical switching elements.

24. The image display device according to claim 23, the spacer having a prismatic shape for supporting the light extraction unit of each of the optical switching elements at each of four positions.

25. The image display device according to claim 23, the thin film being joined to the spacer by electrostatic thermal junction.

26. The image display device according to claim 23, further comprising a driving unit that can drive the light extraction unit of each of the optical switching elements supported by the thin film.

27. The image display device according to claim 26, the driving unit comprising a scanning electrode and a sub-scanning electrode perpendicular to the scanning electrode so that at least one of the scanning electrode and the sub-scanning electrode is disposed on the light guide unit of at least one of the optical switching elements, the other being disposed on at least one of the thin film and the light extracting unit of each of the optical switching elements.

28. The image display device according to claim 27, wherein the at least one of the scanning electrode and the sub-scanning electrode provided on the light guide unit is a transparent electrode.

29. The image display device according to claim 23, each of the light extraction units having wavelength selectivity.

30. The image display device according to claim 23, further comprising a light source that can supply light of primary colors to the light guide unit of each of the optical switching elements in a time division manner.

31. An optical switching element, comprising:
  a light guide unit having a first electrode and, a total reflection surface that can transmit light by total reflection;
  a light extraction unit having:
    a transmissive extraction surface, the transmissive extraction surface being movable between a first position at or less than an extraction distance from the total reflection surface such that an evanescent wave can leak, and a second position greater than the extraction distance from the total reflection surface; and
    a second electrode and an emission member provided on the second electrode on a side of the second electrode opposite the light guide and perpendicular to the first electrode.

32. The optical switching element according to claim 31, wherein the emission member comprises at least one of a micro prism and a micro lens.

33. The optical switching element according to claim 31, wherein the emission member comprises an optical element shaped as at least one of a truncated cone and a truncated pyramid which expands in an emission direction.

34. The optical switching element according to claim 31, wherein the emission member has a light scattering ability.

35. The optical switching element according to claim 31, wherein the emission member emits light by the light extracted by the light extraction unit.

36. The optical switching element according to claim 31, wherein the emission member includes a fluorescent agent.

37. The optical switching element according to claim 31, wherein the light extraction unit has wavelength selectivity.

38. The optical switching element according to claim 31, wherein the light extraction unit is at least one of a scattering type which scatters extracted light extracted by the transmissive extraction surface, and an emission type which emits light extracted by the transmissive extraction surface, and a light absorbing layer is disposed on a side opposite to an emission side of the optical switching element relative to the light guide unit.

39. The optical switching element according to claim 31, further comprising a static light processing unit provided on an emission side of the optical switching element where extracted light extracted by the light extraction unit is emitted.

40. The optical switching element according to claim 39, wherein the light processing unit has a wavefront converting function.

41. The optical switching element according to claim 39, wherein the light processing unit has a wavelength selecting function.

42. The optical switching element according to claim 39, wherein the light processing unit has at least one of a scattering and light emitting function.

43. The optical switching element according to claim 31, further comprising a driving unit that drives the light extraction unit.

44. The optical switching element according to claim 43, wherein the driving unit is capable of electrostatically driving the light extraction unit.

45. The optical switching element according to claim 44, further comprising a transparent electrode provided on the total reflection surface.

46. The optical switching element according to claim 44, wherein the light extraction unit further comprises an emission member that emits light extracted by the transmissive extraction surface, and a transparent electrode is provided on a light guide side of the emission member.

47. An image display device comprising a plurality of optical switching elements, each of the optical switching elements having a structure according to claim 31, the optical switching elements being disposed in a two-dimensional form, the light guide unit of each of the optical switching elements being connected to transmit light.

48. The optical switching element according to claim 47, further comprising a driving unit that drives the light extraction unit.

49. The image display device according to claim 48, wherein the driving unit comprises a scanning electrode and a sub-scanning electrode perpendicular to the scanning electrode so that at least one of the scanning electrode and the sub-scanning electrode is disposed on the light guide unit of at least one of the optical switching elements, the other being disposed on the light extraction unit of each of the optical switching elements.

50. The image display device according to claim 49, wherein the at least one of the scanning electrode and the sub-scanning electrode provided on the light guide unit is a transparent electrode.

51. The image display device according to claim 47, wherein each of the light extraction units has wavelength selectivity.

52. The image display device according to claim 47, further comprising a light source that can supply light of primary colors to the light guide unit of each of the optical switching elements in a time division manner.

53. The optical switching element according to claim 31, the light extraction unit being of a transmission type which guides extracted light in a direction opposite to the transmissive extraction surface, the light extraction unit being provided on an emission side of the optical switching element relative to the light guide unit.

54. The optical switching element according to claim 31, the light extraction unit being a reflection type which guides extracted light to the transmissive extraction surface, the light extraction unit being provided on a side opposite to an emission side of the optical switching element relative to the light guide unit.

* * * * *